United States Patent
Kichline, Jr. et al.

(10) Patent No.: US 6,454,990 B1
(45) Date of Patent: Sep. 24, 2002

(54) MECHANISM FOR SUPPORTING A WORKPIECE DURING A HEAT TREATMENT PROCESS

(75) Inventors: John L. Kichline, Jr., Reading; Richard L. Stuck, Stevens, both of PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/605,116

(22) Filed: Jun. 28, 2000

(51) Int. Cl.$^7$ ................................................ C21B 3/00
(52) U.S. Cl. ........................................ 266/274; 269/48.1
(58) Field of Search .............................. 266/274, 287; 269/48.1

(56) References Cited

U.S. PATENT DOCUMENTS

| | | |
|---|---|---|
| 2,414,141 A | 1/1947 | Denneen et al. |
| 2,462,072 A | 2/1949 | Darmara |
| 2,805,310 A | 9/1957 | Brauer |
| 3,845,944 A * | 11/1974 | Miller et al. ................ 269/48.1 |
| 3,866,010 A | 2/1975 | Cuvelier |
| 4,251,707 A | 2/1981 | Pusateri et al. |
| 6,074,601 A * | 6/2000 | Nakamura et al. .......... 266/274 |

* cited by examiner

Primary Examiner—Scott Kastler
(74) Attorney, Agent, or Firm—MacMillan, Sobanski & Todd, LLC (57) ABSTRACT

A mechanism for supporting an elongated hollow workpiece during a heat treatment process in which the workpiece is rapidly heated and cooled, such as by a induction coil and a quenching ring through which the workpiece is moved. The support mechanism includes a driver member and at least one chuck, but preferably a plurality of chucks, positioned around the driver member. The chucks are movable relative to the driver member in a lateral direction with respect to an axis defined by the elongated workpiece between an engaged position and a disengaged position. In the disengaged position, contact surfaces of the chucks are spaced apart from an inner surface of the workpiece. In the engaged position, the contact surfaces frictionally engage the inner surface of the workpiece, thereby supporting the workpiece.

17 Claims, 3 Drawing Sheets

MECHANISM FOR SUPPORTING A WORKPIECE DURING A HEAT TREATMENT PROCESS

BACKGROUND OF THE INVENTION

This invention relates in general to the manufacture of structural members having desired shapes, such as components for use in vehicle frame assemblies. More specifically, this invention relates to an improved mechanism for supporting a workpiece, such as a closed channel structural member, during a heat treatment process that facilitates the performance of a subsequent deforming process so as to manufacture a vehicle frame component having a desired shape for use in such a vehicle frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modem vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modem vehicles, such as automobiles and minivans.

Traditionally, the various components of known vehicle body and frame assemblies have been formed from open channel structural members, i.e., structural members that have a non-continuous cross sectional shape (U-shaped or C-shaped channel members, for example). Thus, it is known to use one or more open channel structural members to form the side rails, the cross members, and other components of a vehicle body and frame assembly. However, the use of open channel structural members to form the various components of a vehicle body and frame assemblies has been found to be undesirable for several reasons. First, it is relatively time consuming and expensive to bend portions of such components to conform to a desired final shape, as is commonly necessary. Second, after such bending has been performed, a relatively large number of brackets or other mounting devices must usually be secured to some or all of such components to facilitate the attachment of the various parts of the vehicle to the body and frame assembly. Third, in some instances, it has been found difficult to maintain dimensional stability throughout the length of such components, particularly when two or more components are welded or otherwise secured together.

To address this, it has been proposed to form one or more of the various vehicle body and frame components from closed channel structural members, i.e., structural members that have a continuous cross sectional shape (tubular or box-shaped channel members, for example). This cross sectional shape is advantageous because it provides strength and rigidity to the vehicle body and frame component. Also, this cross sectional shape is desirable because it provides vertically and horizontally oriented side surfaces that facilitate the attachment of brackets and mounts used to support the various parts of the vehicle to the body and frame assembly. In some instances, the various parts of the vehicle may be directly attached to the vertically and horizontally oriented side surfaces of the vehicle body and frame assembly.

In vehicle body and frame assemblies of the type described above, many of the various vehicle frame components do not extend linearly throughout their entire lengths. As a result, it is usually necessary to bend or otherwise deform portions of the vehicle frame components to achieve these relatively complex shapes. Unfortunately, it has been found to be relatively difficult to bend or otherwise deform closed channel structural members into desired configurations, particularly when the desired configuration contains one or more relatively sharp bends. In the past, a conventional mechanical bending machine, such as a tube bender, has been used to apply sufficient forces to the closed channel structural member as to deform it to a desired angle. However, the amount by which a closed channel structural member may be deformed by a conventional tube bender or similar mechanical bending machine is limited. Excessive bending can result in fracturing or other damage to the closed channel structural member. This is particularly true when the size of the closed channel structural member is relatively large, as is typically found in vehicle frame components. When attempting to form a relatively sharp bend in a relatively large closed channel structural member, excessive compression occurs at the inner bending radius, while excessive stretching occurs at the outer bending radius of the tube. This generally results in undesirable buckling of the closed channel structural member at the inner bending surface and undesirable stretching or fracturing of the closed channel structural member at the outer bending surface.

To address this, it is known that a closed channel structural member can be heat treated prior to the performance of a bending process so as to increase the ductility thereof. Such a heat treatment process can be performed on the closed channel structural member either in whole or in part and can, for example, consist of a retrogression heat treatment process. A retrogression heat treatment process is performed by rapidly heating a closed channel structural member to a sufficient temperature that provides for full or partial softening thereof, followed by relatively rapid cooling. Notwithstanding this cooling, the closed channel structural member retains the full or partial softening characteristics for at least a relatively short period of time. It is during this relatively short period of time that the deforming process can be performed with relative ease. Thereafter, however, as more time passes, the closed channel structural member re-hardens, and such bending becomes more difficult.

A known heat treatment process which can be used for a retrogression heat treatment process is a scanning heat treatment process. During a scanning heat treatment process, the structural member is heat treated in a continuous and longitudinal manner from one portion to another. The structural member is then subsequently rapidly cooled. This can be accomplished by initially positioning a first end of the structural member adjacent to a hollow heat treatment mechanism, such as an annular inductor coil. The structural member is moved longitudinally through the inductor coil while an electrical current is passed through the induction coil. When the electrical current is passed through the induction coil, corresponding electrical currents are induced to flow within the metallic structural member. Because of the internal electrical resistance of the metallic structural member to the flow of electrical current, these induced electrical currents are converted to heat energy. As a result, the portions of the structural member adjacent the induction coil are rapidly heated to an elevated temperature.

To provide rapid cooling for the retrogression heat treatment, it has been known to use a quenching ring. The quenching ring is typically located adjacent to the inductor coil and sprays a cooling fluid, such as water, inwardly onto the outer surface of the structural member as the structural member is moved therethrough. Because the water is sprayed onto the outer surface of the wall, the hollow structural member is cooled from the outer surface to the inner surface. Although the use of such a quenching ring has been satisfactory, it would be desirable to provide a faster cooling process to decrease production time.

It is well known that vehicle frame components are usually manufactured in relatively large quantities. To promote efficiency in this manufacturing operation, therefore, it is desirable that any process to be performed on a vehicle frame component be capable of being performed in a relatively quick and efficient manner. To accomplish this, it would be desirable to provide a support mechanism that allows the structural member to be quickly fastened and unfastened therefrom such that a heat treatment process can be performed in a relatively quick and easy manner.

SUMMARY OF THE INVENTION

This invention relates to a mechanism for supporting an elongated hollow workpiece during a heat treatment process in which the workpiece is rapidly heated and cooled, such as by an induction coil and a quenching ring through which the workpiece is moved. The support mechanism includes a driver member and at least one chuck, but preferably a plurality of chucks, positioned around the driver member. The chucks are movable relative to the driver member in a lateral direction with respect to an axis defined by the elongated workpiece between an engaged position and a disengaged position. In the disengaged position, contact surfaces of the chucks are spaced apart from an inner surface of the workpiece. In the engaged position, the contact surfaces frictionally engage the inner surface of the workpiece, thereby supporting the workpiece. Preferably, the driver member and the chucks have sloped surfaces relative to the axis, such that the sloped surfaces are in sliding engagement with one another when the chucks are moved between their engaged and disengaged positions. The mechanism preferably includes a ball and socket coupling that suspends and pivotally supports one end of the workpiece so that the workpiece can move in a lateral direction relative to a vertical axis for proper alignment during the heat treatment process. The mechanism also preferably includes a passageway and a port which provide fluid communication between a source of cooling fluid and the hollow interior of the workpiece for cooling the workpiece during the heat treatment process.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
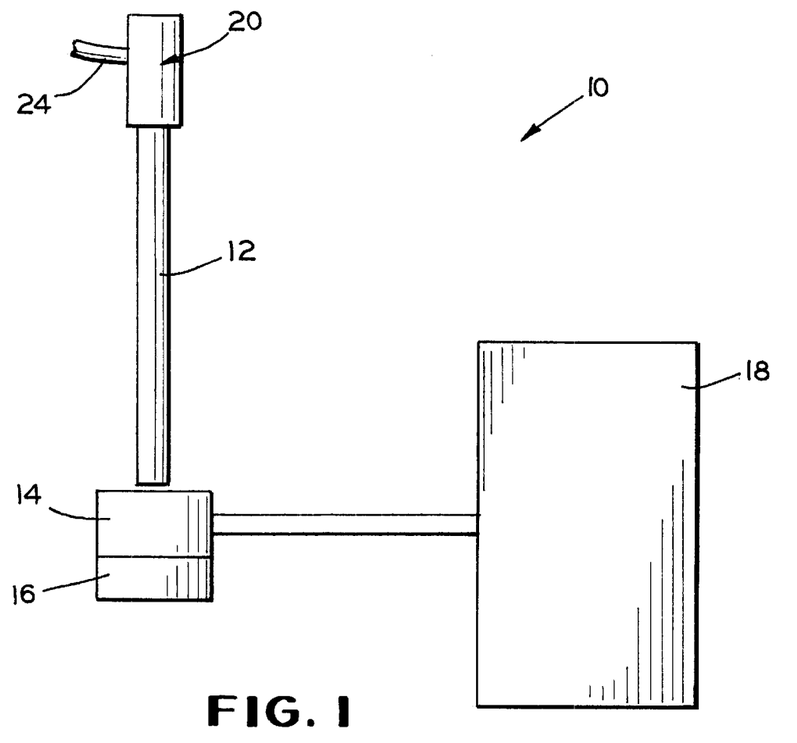
FIG. 1 is a schematic side elevational view of an apparatus for performing a scanning heat treatment process on a workpiece, wherein the workpiece is supported by a support mechanism in accordance with the present invention prior to commencement of the scanning heat treatment process.

Referring now to the drawings, there is schematically illustrated in FIG. 1 an apparatus, indicated generally at 10, for performing a retrogression scanning heat treatment process on a workpiece 12 that is to be manufactured, for example, into a vehicle frame component. The workpiece 12 is preferably a closed channel structural member having a circular or box-shaped cross sectional shape. However, the workpiece 12 may be formed having any desired cross sectional shape. The workpiece is preferably formed from a relatively lightweight metallic material, such as aluminum or alloys thereof. However, any desired metallic material may be used to form the workpiece 12, in accordance with this invention.

To perform the heat treatment process, the apparatus 10 preferably includes an annular induction heating coil 14 and an annular water quenching ring 16 that can disposed adjacent to one another, as illustrated. The induction heating coil 14 is conventional in the art and is connected to a control circuit 18 for selectively causing an electrical current to flow therethrough. The operation of the induction heating coil 14 and the quenching ring 16 will be explained further below.

The apparatus 10 further includes a support mechanism, indicated generally at 20, for engaging one end of the workpiece 12. The support mechanism 20 is structured so as to suspend the workpiece 12 vertically downwardly from one end thereof. The structure of the support mechanism 20 is illustrated in detail in FIGS. 3 and 4 and will be explained in further detail below.

Figure 2:
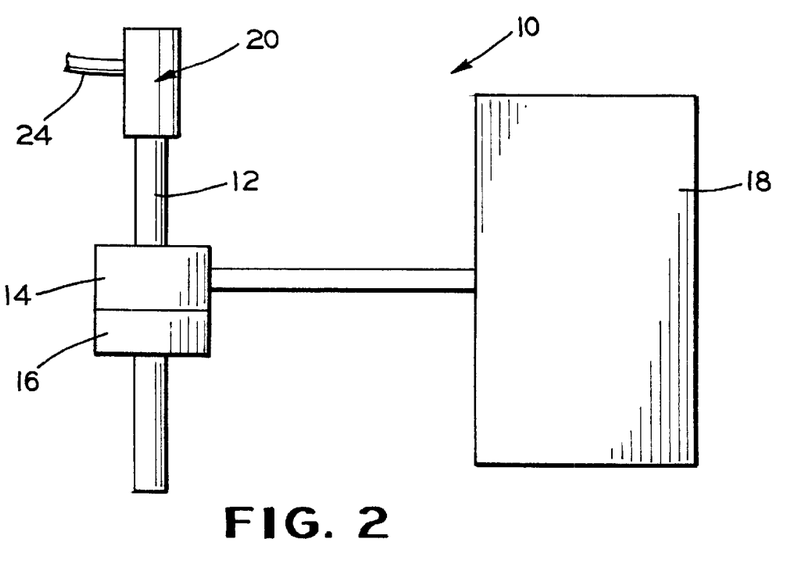
FIG. 2 is a schematic side elevational view similar to FIG. 1 showing the workpiece at an intermediate position during the scanning heat treatment process.

The locations of the support mechanism 20 and the workpiece 12 at the commencement of the scanning heat treatment process to be performed by the induction heating coil 14 and the quenching ring 16 are illustrated in FIG. 1. As shown therein, the workpiece 12 is initially suspended vertically above the induction heating coil 14 and the quenching ring 16 by the support mechanism 20. Then, the support mechanism 20 is operated to lower the workpiece 12 vertically downwardly through the induction heating coil 14 and the quenching ring 16. As this occurs, an electrical current is passed through the induction heating coil 14 by the control circuit 18. As is well known, when an electrical current is passed through the induction heating coil 14, corresponding electrical currents are induced to flow within the metallic workpiece 12. Because of the internal electrical resistance of the metallic workpiece 12 to the flow of electrical current, these induced electrical currents are converted to heat energy. As a result, the leading end of the workpiece 12 that is initially disposed within the induction heating coil 14 is rapidly heated to an elevated temperature. If desired, other heating structures may be provided in lieu of the induction heating coil 14. In FIG. 2, the support mechanism 20 and the workpiece 12 are located at an intermediate position relative to the heating coil 14 and the quenching ring 16 during the scanning heat treatment process. As is apparent from these drawings, the support mechanism is connected to a lift mechanism (see FIG. 3) to lower the workpiece 12 longitudinally downwardly through the induction heating coil 14 such that some or all of the workpiece 12 is heated in a continuous and longitudinal manner from one portion to another.

As mentioned above, the quenching ring 16 is disposed adjacent to the induction heating coil 14. The quenching ring 16 is also conventional in the art and is provided to rapidly cool the workpiece 12 after it has been heated by the induction heating coil 14. Thus, after the leading end of the workpiece 12 has been moved downwardly through the induction heating coil 14 and rapidly heated, it is immediately moved downwardly through the quenching ring 16, wherein it is rapidly cooled by subjecting the workpiece 12 to cooling fluid, such as water. The quenching ring 16 sprays the cooling fluid inwardly onto an outer surface of the workpiece 12 as the workpiece 12 is moved therethrough.

The apparatus 10 can include other cooling structures in addition to the quenching ring 16. Preferably, the support mechanism 20 is configured to provide a fluid path in fluid communication with a conduit 24 connected to a source of cooling fluid (not shown) for directing cooling fluid into the interior of the workpiece 12. The fluid path of the support mechanism 20 will be described in detail below. By directing fluid into the interior of the workpiece 12, the interior surface of the workpiece 12 is rapidly cooled simultaneously with the rapid cooling of the outer surface of the workpiece 12 by the quenching ring 16. This dual cooling provides for faster cooling of the workpiece 12 compared to cooling the workpiece 12 at only the outer surface.

The scanning heat treatment process is preferably a retrogression heat treatment process, wherein the workpiece 12 is rapidly heated by the induction heating coil 14 to a sufficient temperature that provides for full or partial softening thereof, followed by relatively rapid cooling by the quenching ring 16. Notwithstanding this cooling, the workpiece 12 retains the full or partial softening characteristics for at least a relatively short period of time. At the conclusion of the scanning heat treatment process, the workpiece 12 can be released from the support mechanism 20 and transferred to a transport mechanism (not shown) for delivery to an apparatus for deforming the workpiece 12. Preferably, this deforming process is performed during the period of time following the retrogression heat treatment process in which the workpiece 12 retains the full or partial softening characteristics. Any desired deforming process may be performed on the workpiece 12.

If, for example, the workpiece 12 is a closed channel structural member, the deforming process may be performed by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member can be deformed into the desired final shape for the vehicle frame component by the hydroforming process.

The deforming process may alternatively be performed by magnetic pulse forming. Magnetic pulse forming is also a well known process that uses an electromagnetic field to deform a workpiece into a desire shape. To accomplish this, an electromagnetic coil is provided for generating an intense magnetic field within or about the workpiece. When this occurs, a large pressure is exerted on the workpiece, causing it to be deformed against a support surface. If the electromagnetic coil is disposed about the exterior of the workpiece, then the workpiece is deformed inwardly into engagement with the support surface. If, on the other hand, the electromagnetic coil is disposed within the interior of the workpiece, then the workpiece is deformed outwardly into engagement with the support surface. In either event, the workpiece can be deformed into the desired final shape for the vehicle frame component by the magnetic pulse forming process.

The workpiece 12 is preferably supported vertically during the scanning heat treatment process to prevent the shape thereof from becoming distorted. This is because vehicle frame components are frequently relatively long in length and are relatively heavy in weight. If a relatively long and heavy workpiece 12 is suspended horizontally at its two ends during the scanning heat treatment process, it is possible that the central portion thereof may bow downwardly or otherwise distort under the influence of gravity during- or after the scanning heat treatment process. By suspending the workpiece 12 vertically during the scanning heat treatment process, the likelihood of such distortions is greatly reduced because the weight of the workpiece 12 is insufficient to cause any significant elongation or other shape distortion thereof.

It is also desirable to move the workpiece 12 through the heating coil 14 such that the workpiece 12 is centered relative to the internal walls of the induction coil 14 so that the workpiece 12 is subjected to a relatively even distribution of electrical currents. As will be described in below, the support mechanism 20 supports the workpiece 12 by a coupling assembly that allows for relative movement of the workpiece 12 such that the workpiece 12 can move in a generally lateral direction relative to an axis defined by the workpiece 12. The electrical currents generated by the induction coil 14 create a magnetic field about the workpiece 12 that tends to center the workpiece 12 relative to the induction coil 14. Thus, if the support mechanism 20 is misaligned with the induction coil 14 or the shape of the workpiece 12 is not true relative to its axis, the support mechanism 20 will permit the workpiece 12 to center itself relative to the induction coil 14.

After desired deformation of the workpiece 12 into a vehicle frame component, the vehicle frame component can be secured to one or more other vehicle frame components to form a vehicle frame assembly. The securing of such vehicle frame components may be performed in any conventional manner. However, one preferred manner for securing two vehicle frame components together is by magnetic pulse welding. Magnetic pulse welding is a well known process wherein first and second vehicle frame components are initially disposed telescopically within one another. When so disposed, one portion of the first vehicle frame component overlaps one portion of the second vehicle frame component. An electromagnetic coil is provided for generating an intense magnetic field within or about the overlapping portions of the first and second vehicle frame components. When this occurs, a large pressure is exerted on one of the first and second vehicle frame components, causing it to move toward the other at a high velocity. If the electromagnetic coil is disposed about the exterior of the two vehicle frame components, then the outer vehicle frame component is deformed inwardly into engagement with the inner vehicle frame component. If, on the other hand, the electromagnetic coil is disposed within the interior of the two vehicle frame components, then the inner vehicle frame component is deformed outwardly into engagement with the outer vehicle frame component. In either event, the high velocity impact of the first and second vehicle frame components cause the two vehicle frame components to become permanently joined together.

Figure 3:
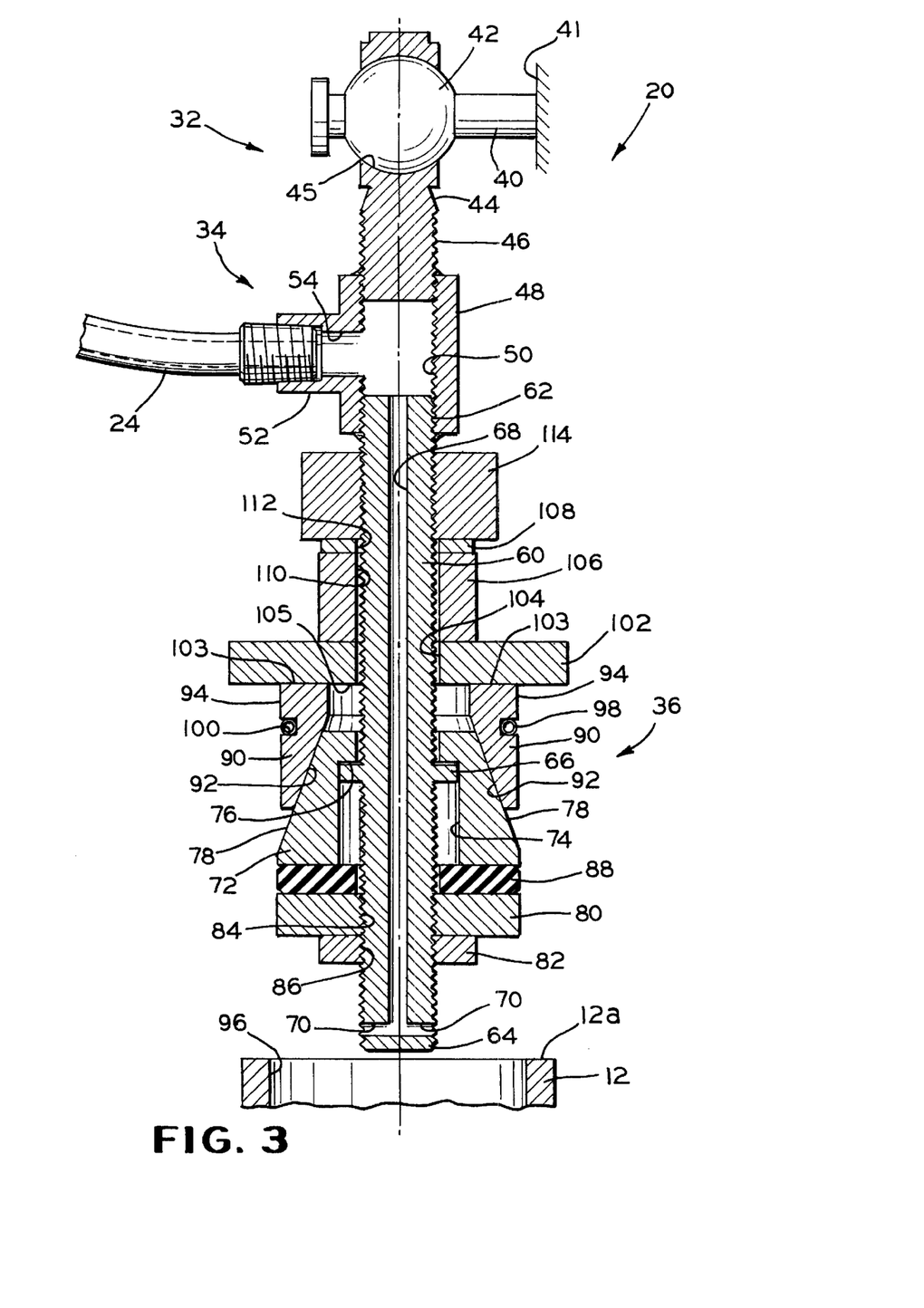
FIG. 3 is an enlarged sectional view of the support mechanism illustrated in FIGS. 1 and 2 prior to the workpiece being secured thereto.

A preferred structure of the support mechanism 20 is illustrated in FIG. 3. As shown therein, the support mechanism 20 generally includes an upper coupling assembly indicated generally at 32, an intermediate fluid connection assembly indicated generally at 34, and a lower collet assembly indicated generally at 36. The coupling assembly 32 allows for pivoting movement of the workpiece 12 in a generally lateral direction relative to an axis A defined by the workpiece 12. The fluid connection assembly 34 provides fluid communication between the fluid conduit 24 and a passageway formed in the collet assembly 36 for directing cooling fluid into the interior of the workpiece 12, as will be described in detail below. The collet assembly 36 is operated to selectively engage and support hold an upper end 12a of the workpiece 12.

The coupling assembly 32 includes a horizontally extending lifting arm 40 that is attached to a vertical lift mechanism 41 for vertically moving the support mechanism 20 relative to the induction coil 14 and the quenching ring 16, as described above with respect to FIGS. 1 and 2. The lift mechanism 41 can be any suitable device that is capable of selectively moving the lifting arm 40 in a generally vertical direction. The lifting arm 40 includes a ball 42 having a generally spherical shape. The coupling assembly 32 further includes a socket arm 44 having a partially spherical groove 45 formed therein that engages the outer surface of the ball 42. The ball 42 and the socket arm 44 cooperate to support the socket arm 44 on the lifting arm 40, while permitting the socket arm 44 to pivot relative to the ball 42. The socket arm 44 includes a lower portion 46 having external threads formed thereon.

The fluid connection assembly 34 includes a generally T-shaped fitting 48 having a threaded bore 50 formed therethrough. The lower portion 46 of the socket arm 44 is threaded into the upper end of the threaded bore 50 of the fitting 48, thereby connecting the fitting 48 to the coupling assembly 32. The fitting 48 includes a lateral extension 52 having a passageway 54 formed therein that communicates with the bore 50. The fluid conduit 24 is connected to the extension 52 to provide fluid communication between the source of cooling fluid and the bore 50.

The collet assembly 36 includes an elongated center shaft 60 having an upper end 62 and a lower end 64. The shaft 60 has external threads extending generally along its entire length. The upper end 62 of the shaft 60 is threaded into the lower end of the threaded bore 50 of the fitting 48, thereby connecting the collet assembly 36 to the coupling assembly 32. If desired, the upper end 62 of the shaft 60 and the lower end 46 of the socket arm 44 can be welded or otherwise sealed relative to the fitting 48. The shaft 60 can include an annular flange 66 extending radially outwardly from an intermediate portion of the shaft 60 for a purpose that will be explained below. The shaft 60 has a passageway 68 formed therein that is in fluid communication with the bore 50 of the fitting 48. The passageway 68 also communicates with one or more ports 70 formed radially outwardly through the lower end 64 of the shaft 60. As will be discussed below, the ports 70 provide a conduit for cooling fluid to be directed into the interior of the workpiece 12.

A generally hollow cylindrical driver member 72 is disposed about the shaft 12. The inner surface of the driver member 72 includes a stepped bore 74 defining an internal shoulder 76. The shoulder 76 cooperates with the annular flange 66 of the shaft 60 to retain the driver member 72 relative to the shaft 60. The outer surface of the driver member 72 is tapered or frustoconical in shape. The collet assembly 36 further includes a hollow cylindrical disk 80 having a threaded bore 84 and a retaining nut 82 having a threaded bore 86. Thus, the disk 80 and the nut 82 are threadingly connecting to the shaft 60. Preferably, an elastomeric or otherwise compressible damper 88 is provided between the driver member 72 and the disk 80, the reason for which will be explained below.

The collet assembly 36 further includes a plurality of arcuate shaped chucks 90 that are disposed about the driver member 72. The collet assembly 36 can have any suitable number of chucks 90 which are preferably similar in shape. It has been found that four similarly shaped chucks 90 are suitable for the purposes explained below. Preferably, the chucks 90 are spaced apart from one another by a substantially equal angular amount. Each chuck 90 includes a tapered or frustoconical inner surface 92 corresponding and contacting with the frustoconical outer surface 78 of the driver member 72. Each chuck 90 further includes an outer surface 94. The outer surfaces 94 of the chucks 90 together define a generally cylindrical shape that is oriented coaxially relative to the axis A of the workpiece 12. As will be described below, the support mechanism 20 holds the workpiece 12 by the frictional engagement between the surfaces 94 of the chucks 90 and an inner cylindrical surface 96 of the workpiece 12. Preferably, the contact surfaces 94 are serrated or otherwise textured to assist in frictionally engaging the workpiece 12. The chucks 90 are preferably retained about the driver member 72 by a coil spring retainer 98 wrapped thereabout. Grooves 100 may be formed in the outer surfaces 94 of the chucks 90 to retain the coil spring retainer 98. The coil spring 98 retains the chucks 90 on the driver member 72 while permitting the chucks 90 to expand and contract radially relative to one another in the manner described below.

The collet assembly 36 further includes a generally cylindrically shaped stop plate 102 positioned above upper ends 103 of the chucks 90. The upper ends 103 of the chucks 90 abut a lower surface 105 of the stop plate 102. The stop plate 102 includes a cylindrical bore 104 formed therein that preferably defines a diameter that is slightly larger than the outer diameter of the external threads of the shaft 60. Thus, the plate 102 is not threadingly engaged with the shaft 60 and is free to move axially with respect thereto. The collet assembly 36 also includes a bushing 106 having a bore 110 formed therein and a spacer 108 having a 112 formed therein. The bushing 106 and the spacer 108 are not threadingly engaged with the shaft 60. Lastly, a threaded nut 114 is threaded onto the threaded shaft 60 between the spacer 108 and the lower end of the fitting 48.

The operation of the support mechanism 20 will now be described. Prior to the fastening of the workpiece 12 to the collet assembly 36, the chucks 90 are located in a disengaged position relative to the driver member 72, as shown in FIG. 3. In the disengaged position, the surfaces 94 of the chucks 90 cooperate to define a generally cylindrical surface having a diameter that is less than an inner diameter defined by the inner surface 96 of the workpiece 12. To place the chucks 90 in their disengaged position, the stop plate 102 is spaced apart from the driver member 72 by a predetermined initial axial distance. The spring retainer 98 causes the chucks 90 to slide upward along the frustoconical surface 78 of the driver member 72 so that the upper ends 103 of the chucks 90 abut the lower surface 105 of the stop plate 102.

Figure 4:
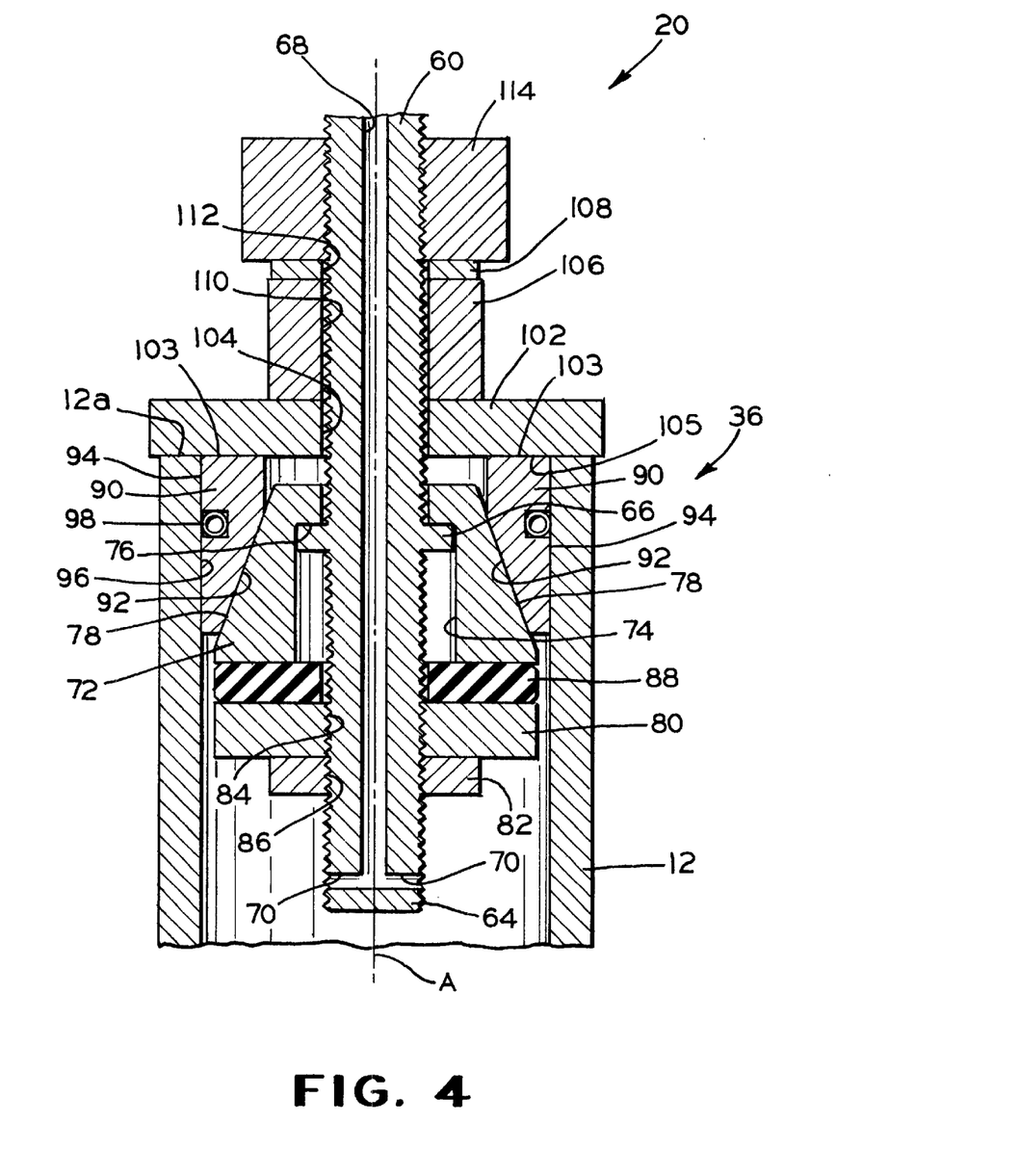
FIG. 4 is a sectional view of a portion of the support mechanism illustrated in FIG. 3 showing the workpiece secured thereto.

While the chucks 90 are in their disengaged positions, the workpiece 12 is moved upward and over the collet assembly 36, as shown in FIG. 4, so that the inner surface 96 of the workpiece 12 is positioned about the contact surfaces 94 of the chucks 90. Preferably, the workpiece 12 is moved upward until the upper end 12a thereof abuts the lower surface 105 of the stop plate 102. The nut 114 is then rotated in the proper rotational direction to move it axially downwardly relative to the shaft 60. Such downward axial movement causes corresponding downward movement of the spacer 108, the bushing 106, and the stop plate 102 relative to the shaft 60. If desired, the nut 114 can include a lever (not shown) extending radially outwardly with respect to the axis A to assist in manual rotation of the nut 114. The downward movement of the stop plate 102 pushes against the upper surfaces 103 of the chucks 90, forcing them to move in a downward and laterally outward direction because of the sliding engagement between the frustoconical surface 78 of the driver member 72 (which is maintained in position relative to the shaft 60 by virtue of the disk 80 and the retaining nut 82) and the tapered annular surfaces 92 of the chucks 90. The annular surfaces 92 of the chucks 90 and the frustoconical surface 78 of the driver member 72 define sloped surfaces which are in sliding engagement with one another when the chucks 90 are moved between their disengaged and engaged positions. The annular surfaces 92 and the frustoconical surface 78 can be formed at any suitable angle with respect to the axis A to provide the desired lateral movement of the chucks 90 relative to the threaded pitch of the nut 114 and shaft 60. After the chucks 90 have moved a sufficient distance to their engaged position, as shown in FIG. 4, the outer surfaces 94 of the chucks 90 will abut and frictionally engage the inner surface 96 of the workpiece 12.

Preferably, the stop plate 102 is moved a sufficient distance to slightly compress the damper 88 between the driver member 72 and the disk 80. The compression of the damper 88 biases the driver member 72 in an upward direction towards the stop plate 102 to assist in maintaining the frictional contact between the chucks 90 and the inner surface 96 of the workpiece 12. The damper 88 can be made of any suitable compressible material, such as an elastomeric material. Preferably, the annular flange 66 of the shaft 60 is spaced from the shoulder 76 of the driver member 72 by a slight distance, as shown in FIG. 3 when the chucks 90 are in their disengaged position. When the chucks 90 are moved to their engaged positions and the damper 88 is compressed, the shoulder 76 of the driver member 72 will abut the annular flange 66 of the shaft 60, as shown in FIG. 4, thereby preventing further compression of the damper 88. Thus, the compressive distance of the damper 88 can be controlled by the positioning of the driver member 72 along the shaft 60. The positioning of the driver member 72 along the shaft 60 is controlled by the position of the threaded disk 80 and the threaded nut 82 along the shaft 60.

After the workpiece 12 has been fastened to the collet assembly 36, the workpiece 12 can be moved through the induction coil 14 and the quenching ring 16 for performing the scanning heat treatment. As described above, the quenching ring 16 directs cooling fluid onto the outer surface of the workpiece 12. Preferably, during the entire scanning heat treatment, cooling fluid is simultaneously directed into the interior of the workpiece 12 and onto the inner surface 96 thereof to provide a rapid cooling of the workpiece 12. This interior cooling is provided by directing fluid from the source of cooling fluid through the conduit 24, the passageway 54 and bore 50 of the fitting 48, the passageway 68 of the shaft 60, and out through the ports 70. Although any suitable number of ports 70 can be formed in the shaft 60, it has been found that six ports 70 equally spaced about the circumference of the shaft 60 provides sufficient cooling.

As stated above, it is desirable to move the workpiece 12 through the heating coil 14 such that the workpiece 12 is centered relative to the internal walls of the induction coil 14 so that the workpiece 12 is subjected to a relatively even distribution of electrical currents. The coupling assembly 32 of the present invention provides for a pivoting connection between the support mechanism 20 and the workpiece 12 such that the free end (lower end) of the workpiece 12 can move laterally with respect to the axis A. The electrical currents generated by the induction coil 14 will tend to center the workpiece 12 within the magnetic field generated by the circular induction coil 14, thereby automatically centering the workpiece 12 relative thereto. The coupling between the ball 42 and the spherically shaped groove 45 of the socket arm 44 provides the pivoting connection between the workpiece 12 and the support mechanism 20. Of course, any suitable type of pivoting connection can be used which permits lateral movement of the free end of the workpiece 12 relative to the axis A.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A support mechanism for selectively engaging and supporting a portion of a workpiece comprising:
    an arm that is adapted to be supported on a structure;
    a first member that is supported on said arm by a coupling assembly for pivoting movement relative to said arm; and
    a second member that is supported on said first member for movement relative to said first member between an engaged position, wherein a contact surface on said second member is positioned to engage and support the portion of the workpiece, and a disengaged position, wherein said contact surface is positioned to not engage and support the portion of the workpiece.

2. A support mechanism for selectively engaging and supporting a portion of a workpiece comprising:
    a shaft that is adapted to be supported on a structure, said shaft having a passageway formed therethrough that is adapted to communicate with a source of fluid;
    a first member that is supported on said shaft; and
    a second member that is supported on said first member for movement relative to said first member between an engaged position, wherein a contact surface on said second member is positioned to engage and support the portion of the workpiece, and a disengaged position, wherein said contact surface is positioned to not engage and support the portion of the workpiece, said passageway being adapted to communicate fluid from the source of fluid to the workpiece.

3. The support mechanism defined in claim 1 further including a shaft that is connected to said arm by said coupling assembly for pivoting movement relative to said arm, said first member being supported on said shaft.

4. The support mechanism defined in claim 3 wherein said shaft has a passageway formed therethrough that is adapted to communicate fluid from a source of fluid to the workpiece.

5. The support mechanism defined in claim 3 wherein said shaft has a threaded surface formed thereon, and further including a nut that is threaded onto said shaft, said nut engaging said second member such that rotation of said nut causes movement of said second member relative to said first member.

6. The support mechanism defined in claim 5 further including a stop plate that is threaded onto said shaft, said stop plate engaging said first member to retain said first member in position relative to said shaft.

7. The support mechanism defined in claim 1 wherein said first member has a tapered outer surface, and wherein said second member has a tapered inner surface that engages said tapered outer surface of said first member such that movement of said second member between said engaged and disengaged positions.

8. The support mechanism defined in claim 1 wherein a plurality of second members is supported on said first member for movement relative to said first member between an engaged position, wherein a contact surface on each of said second members is positioned to engage and support the portion of the workpiece, and a disengaged position, wherein each of said contact surfaces is positioned to not engage and support the portion of the workpiece.

9. The support mechanism defined in claim 8 wherein said first member has a tapered outer surface, and wherein each of said second members has a tapered inner surface that engages said tapered outer surface of said first member causes movement of each of said members between said engaged and disengaged positions.

10. The support mechanism defined in claim 8 wherein said plurality of second members is retained on said first member by a spring.

11. The support mechanism defined in claim 2 further including an arm that is adapted to be supported on a structure and a coupling assembly for connecting said shaft to said arm for pivoting movement relative to said arm.

12. The support mechanism defined in claim 2 wherein said shaft has a threaded surface formed thereon, and further including a nut that is threaded onto said shaft, said nut engaging said second member such that rotation of said nut causes movement of said second member relative to said first member.

13. The support mechanism defined in claim 12 further including a stop plate that is threaded onto said shaft, said stop plate engaging said first member to retain said first member in position relative to said shaft.

14. The support mechanism defined in claim 2 wherein said first member has a tapered outer surface, and wherein said second member has a tapered inner surface that engages said that engages said tapered outer surface of said first member such that movement of said second member relative to said first member causes movement of said second member between said engaged and disengaged positions.

15. The support mechanism defined in claim 2 wherein a plurality of second members is supported on said first member for movement relative to said first member between an engaged position, wherein a contact surface on each of said second members is positioned to engage and support the portion of the workpiece, and a disengaged position, wherein each of said contact surfaces is positioned to not engage and support the portion of the workpiece.

16. The support mechanism defined in claim 15 wherein said first member has a tapered outer surface, and wherein each of said second members has a tapered inner surface that engages said tapered outer surface of said first member such that movement of each of said second members relative to said first member causes movement of each of said second members between said engaged and disengaged positions.

17. The support mechanism defined in claim 15 wherein said plurality of second members is retained on said first member by a spring.

* * * * *

UNITED STATES PATENT AND TRADEMARK OFFICE
CERTIFICATE OF CORRECTION

PATENT NO.    : 6,454,990 B1
DATED         : September 24, 2002
INVENTOR(S)   : Kichline Jr. et al.

It is certified that error appears in the above-identified patent and that said Letters Patent is hereby corrected as shown below:

Column 12,
Line 17, delete the words "said" that engages" before "said tapered outer surface"

Signed and Sealed this

Twenty-eighth Day of January, 2003

JAMES E. ROGAN
*Director of the United States Patent and Trademark Office*